(12) United States Patent
Bodmer et al.

(10) Patent No.: US 6,638,455 B1
(45) Date of Patent: Oct. 28, 2003

(54) INTERNAL COOLING WITH LIQUID GAS

(75) Inventors: Werner Bodmer, Haslach (DE);
Rainer Armbruster, Wolfach (DE);
Udo Bodmer, Haslach (DE)

(73) Assignee: Foboha GmbH, Haslach (DE)

( * ) Notice: Subject to any disclaimer, the term of this patent is extended or adjusted under 35 U.S.C. 154(b) by 0 days.

(21) Appl. No.: 09/622,618

(22) PCT Filed: Feb. 18, 1999

(86) PCT No.: PCT/EP99/01056
§ 371 (c)(1),
(2), (4) Date: Aug. 18, 2000

(87) PCT Pub. No.: WO99/42269
PCT Pub. Date: Aug. 26, 1999

(30) Foreign Application Priority Data

Feb. 19, 1998 (EP) .............................................. 98102855

(51) Int. Cl.⁷ .............................................. B29C 33/04
(52) U.S. Cl. .................... 264/85; 264/237; 264/238.16; 264/348; 425/552; 425/575; 425/576; 425/526; 249/79
(58) Field of Search .......................... 264/85, 237, 238, 264/348, 349, 328.16; 425/552, 528, 575, 576; 249/79

(56) References Cited

U.S. PATENT DOCUMENTS

| | | | |
|---|---|---|---|
| 3,667,248 A | * 6/1972 | Carlson | ........................ 62/225 |
| 3,740,180 A | 6/1973 | Sidur | |
| 3,819,317 A | 6/1974 | Higginbotham | |
| 3,870,452 A | * 3/1975 | Frank | ......................... 425/552 |
| 4,069,282 A | * 1/1978 | Gutermuth et al. | ........... 264/28 |
| 4,139,177 A | * 2/1979 | Hanning | ...................... 249/66 |
| 4,208,177 A | * 6/1980 | Allen | .......................... 425/404 |
| 4,517,139 A | 5/1985 | Rawlings et al. | |
| 4,812,115 A | * 3/1989 | Kemp | ......................... 425/552 |
| 5,516,470 A | * 5/1996 | Larsson | ....................... 264/39 |
| 5,804,125 A | * 9/1998 | Aepli | ......................... 264/310 |

OTHER PUBLICATIONS

Patent Abstracts of Japan, Publication No. 56037137, Publication Date Oct. 04, 1981, Cooler for Mold.

* cited by examiner

*Primary Examiner*—Stefan Staicovici
(74) *Attorney, Agent, or Firm*—Rankin, Hill, Porter & Clark LLP

(57) ABSTRACT

In a method for the internal cooling of a rotating object (4), liquid gas from at least one inlet channel (61) in a fixed object (5) is pressed into a ring-shaped groove (62) located between the fixed object (5) and the rotating object (4). From the ring-shaped groove (62) the liquid gas is pressed into at least one channel (63, 64.1, 64.2) in the rotating object (4) and brought to a part to be cooled (15). The liquid gas, upon contact with the part, evaporates and expands while absorbing heat, thereby cooling the part. The area surrounding the part to be cooled (15) may be designed as an expansion chamber (65). The method can be used to cool molded parts in injection molding machines with rotating molds (1), thereby achieving shorter cycle times.

15 Claims, 4 Drawing Sheets

INTERNAL COOLING WITH LIQUID GAS

BACKGROUND OF THE INVENTION

The invention relates to a method for the internal cooling of a rotating object with liquid gas and to a device for implementation of the cooling method. The method is suitable in particular for the cooling of molded parts in injection molding machines with rotating molds.

In many fields of technology there is a requirement for an internal cooling of a rotating object. Such an internal cooling is achieved by introducing a cooling liquid, for example water, from a non-rotating, fixed object into the at least partially adjoining rotating object. In the rotating object, the cooling liquid is then conveyed to the part to be cooled. The liquid absorbs the thermal energy from the part and takes heat away, thereby producing a cooling effect. In doing so, the rotating object, for example, can be designed as a shaft, the fixed object, for example, as a bearing for supporting the shaft.

The introduction of the cooling liquid from the fixed object into the rotating object usually takes place axially. The transfer point between the fixed and rotating objects is situated on the axis of rotation. Such an arrangement is desirable, because with it the transfer point is not moving relative to the fixed object. There are, however, instances, where the rotating object is not axially accessible.

In some applications it is desirable to cool with a liquid gas instead of with a conventional liquid. Cooling processes with liquid gas are known as such. In them, a liquid gas is conveyed to the part to be cooled, whereby it usually is compressed all the more, the closer it is to the part to be cooled. At the part to be cooled an evaporation and an expansion of the initially liquid, compressed gas is permitted. During evaporation and expansion, thermal energy is withdrawn from the part to be cooled, as a result of which a cooling effect is produced. The gas is then removed in a gaseous physical condition (condition of aggregation).

If such a liquid gas is to be introduced into a rotating object from a fixed object, particular problems occur. The liquid gas possibly-depending on its chemical composition, temperature and pressure-is in a special physical condition (condition of aggregation), which, while advantageous for the cooling, is exceedingly delicate with respect to the handling. In any case, an evaporation and/or expansion of the liquid gas has to be avoided, because this would lead to freezing of the transfer point. Because of the special physical condition (condition of aggregation) of the liquid gas, in particular sealing problems at the transfer point have to be solved.

SUMMARY OF THE INVENTION

It is an object of the invention to provide a method for the internal cooling of a rotating object with liquid gas, which solves or minimizes the problems set forth hereinbefore. It is furthermore an object of the invention to create a device for the implementation of this method.

In case of the method in accordance with the invention for the internal cooling of a rotating object, liquid gas is pressed from at least one inlet channel in a fixed object into a ring-shaped groove disposed at a contact surface between the fixed object and the rotating object. From the ring-shaped groove, the liquid gas is pressed into at least one channel in the rotating object and fed to at least one part to be cooled at which point the liquid gas evaporates, absorbs vaporization heat, and is removed as gaseous gas.

In preference, in an area surrounding the part to be cooled a greater cross-sectional surface area is made available to the liquid gas for flowing through, such as the sum of the cross-sectional surface areas of the at least one channel. As a result of this greater cross-sectional surface area in the area surrounding the part, the liquid gas evaporates and expands while absorbing thermal energy. The volume of the gas following the expansion, for example, can amount to 600 times its volume prior to the expansion.

The total cross-sectional surface area, which is made available to the liquid gas on the way from the fixed object to the object to be cooled, is preferably maintained constant or reduced, so that the liquid gas does not expand on the way to the part to be cooled and so that an optimum cooling effect is obtained at the part to be cooled. It is particularly advantageous to reduce the total cross-sectional surface area at least once, which is made available to the liquid gas on the way to the part to be cooled, so that the liquid gas is compressed. This can be achieved, for example, by contractions of the channels. While the inlet channel in the fixed object may have a diameter of several millimetres, the last section of the channel in the rotating object may have a diameter of 0.5 mm or less; even capillary dimensions can be utilized. In this regard, "total cross-sectional surface area" is: the cross-sectional surface area of the one channel, if only one channel is present, resp., the sum of the cross-sectional surface areas of all channels, if several channel are present; in this, the cross-sectional surface areas are always measured vertical or perpendicular to the direction of flow of the gas.

The device in accordance with the invention for the implementation of the method has a fixed object, in which an object rotating around a rotation axis is rotatably fixed. The fixed object has at least one inlet channel for liquid gas. The rotating object is surrounded by a ring-shaped groove, into which the at least one inlet channel leads and the center of which is situated on the rotation axis of the rotating object. The ringshaped groove can be machined into the rotating object and/or into the fixed object. The rotating object has at least one channel for liquid gas that leads out from the ringshaped groove into the area surrounding a pan to be cooled.

The area surrounding the part to be cooled preferably has a greater cross-sectional surface area than the sum of the cross-sectional surface areas of the at least one channel in the rotating object, whereby these cross-sectional surface areas are measured in essence vertically or perpendicular to the rotation axis. As a result of this, the gas is provided with sufficient volume for an expansion. The area surrounding the part to be cooled can, for example, be at least one expansion chamber.

The cross-sectional surface area of the inlet channel or, if several inlet channels are present, the cross-sectional surface area of the inlet channels, is preferably greater than double the cross-sectional surface area of the ring-shaped groove. If this requirement is fulfilled, then the liquid gas does not evaporate and/or expand in the vicinity of the ring-shaped groove. Evaporation and/or expansion could have the consequence that too much heat would be removed from the surroundings of the ringshaped shaped groove and that this surrounding area would freeze, which is undesirable.

The double cross-sectional surface area of the ring-shaped groove is preferably greater than the sum of the cross-sectional surface areas of the at least one channel. The sum of the cross-sectional surface areas of the at least one inlet channel to the ring-shaped groove preferably remains constant or is reduced. The sum of the cross-sectional surface areas of the at least one channel leading to the cooling place preferably remains constant or is reduced. By means of such measures, however, the liquid gas is compressed on its path to the place to be cooled, so that an optimum cooling effect is obtained.

In order to prevent the occurrence of accumulations of heat, advantageously at those points where an accumulation of heat could occur, porous steel is utilized. This material stores the cold and, if so required, absorbs thermal energy.

The method in accordance with the invention can advantageously be used for the cooling of molded parts in injection molding machines with rotating molds. Rotating molds like this provide many advantages. There is, e.g., the possibility to inject the molten mass (for example, molten plastic mass) into the mold from several injection stations. With this, first of all molded parts with different geometrical shapes, different colors, or made of different materials can be manufactured. Secondly, with this it is also possible to make molded parts out of several components (multi-component process). Therefore, molded parts that have several colors or consist of several materials (assembly injection molding) can be made. Rotating molds apart from this also make possible the utilization of intermediate stations for different operations and shorter cycle times. The liquid gas can be fed in continuously or else also in batches, e.g., only then, when cooling within an injection molding cycle is necessary.

With the method in accordance with the invention, and with the device in accordance with the invention, cycle times can be even more massively reduced thanks to the exceedingly efficient cooling of just-injected molded parts. The invention presented here solves the problem of the introduction of liquid gas into the shaft rotating from time to time, on which the injection mold is suspended.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
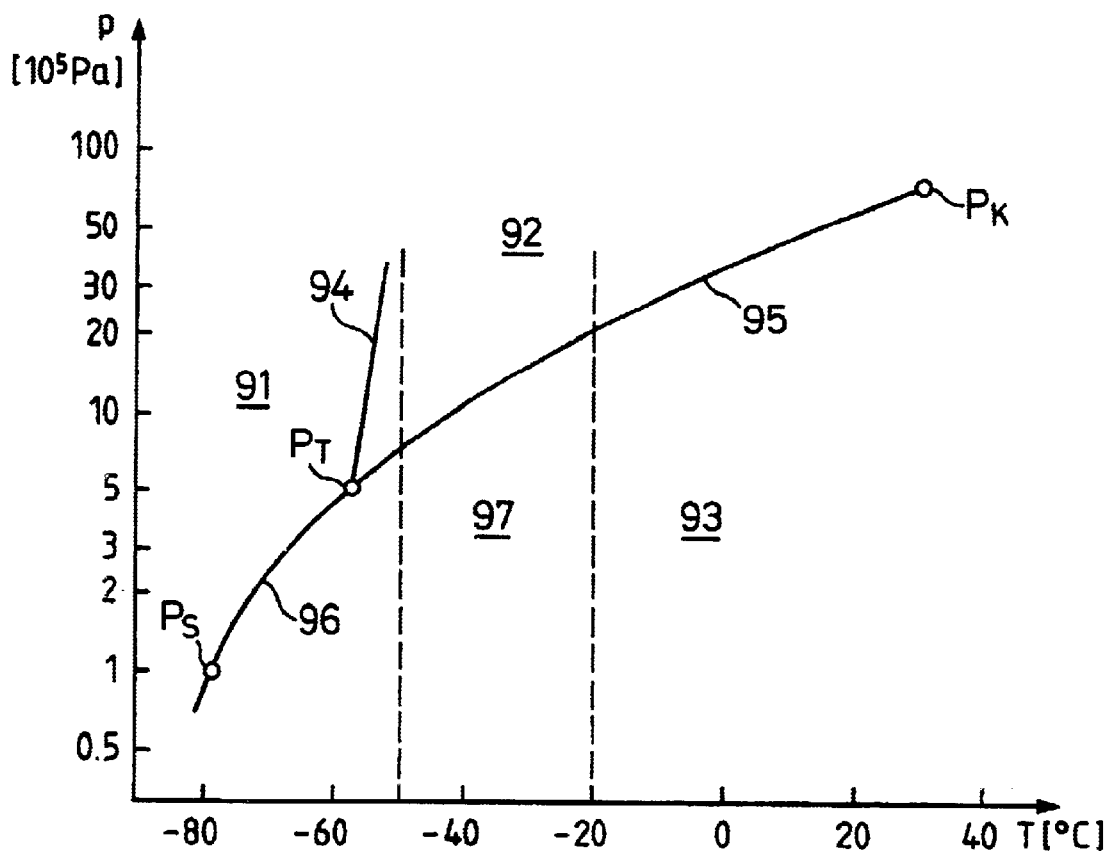
FIG. 1 is a (p,T) phase diagram for $CO_2$.

Used as a cooling medium with the method in accordance with the invention, and in the device in accordance with the invention, in preference is $CO_2$. FIG. 1 shows a (p,T) phase diagram for $CO_2$, the numerical values of which have been taken from Landolt-Börnstein, Numerical Values and Functions, volume IV, 4th part, Springer-Verlag, 6th printing, 1967, pages 178–179 and 296. In this diagram, on the horizontal axis the temperature T in ° C. is marked linearly and on the vertical axis logarithmically the pressure P in $10^5$ Pa (which approximately corresponds to one atmosphere). A region of the solid phase 91, a region of the liquid phase 92 and a region of the gaseous phase 93 can be differentiated between. These regions 91–93 are separated from one another by the melting pressure curve 94, a vapour pressure curve 95, resp., a sublimation pressure curve 96. The curves 94–96 meet at a triple point $P_T$. Further characteristic points in the (p,T) diagram are a critical point $P_K$ and a sublimation point $P_s$.

The cooling medium $CO_2$ is preferably brought to the part to be cooled in a compressed liquid condition at temperatures of −50 to −20° C. (223 to 253 K). This temperature range 97 in FIG. 1 is indicated with broken lines. The course of the vapour pressure curve 95 in this temperature range 97 shows that high pressures between approx. $7*10^5$ and $20*10^5$ are necessary in order to keep the $CO_2$ liquid. If this requirement is to be fulfilled, then the cross section of inlet channels on the way to the part to be cooled must not significantly increase. Also no tight places must occur; this makes the transfer of the cooling medium from the fixed object to the rotating object particularly difficult.

A further possible cooling medium is nitrogen ($N_2$).

Figure 2:
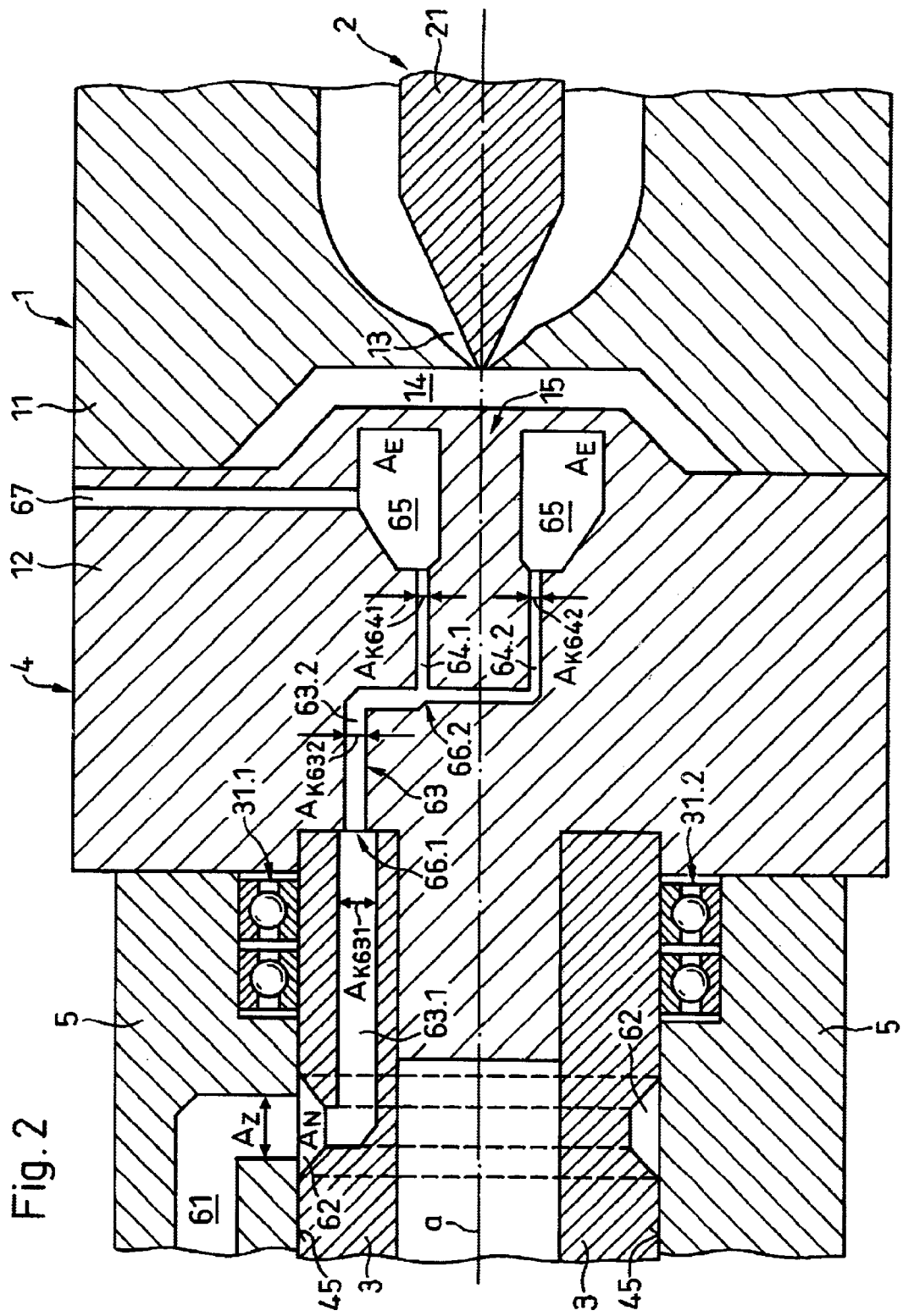
FIG. 2 is a longitudinal section through an exemplary embodiment of a device in accordance with the invention, used in an injection-molding machine.

FIG. 2 illustrates a schematic longitudinal section through an exemplary embodiment of a device in accordance with the invention. The device is built into an injection molding machine with a mold 1 rotating around a rotation axis a. Shown of it schematically is only the mold 1, composed of first half mold 11 and a second half mold 12. The first mold half 11 has a cutting 13, through which molten plastic mass can be injected into a forming hollow space 14 between the first mold half 11 and the second mold half 12. Of an injection nozzle 2 only a part, for example, a heat-conducting torpedo 21 is illustrated. The second mold half 12 is mounted on a shaft 3, for example, a hollow shaft and together with it forms a rotating object 4. The shaft 3, for example, can be rotatably supported on ball bearings 31.1, 31.2 in a fixed object 5. Such a rotating injection mold 1, as mentioned at the beginning, has many advantages.

The object now is to efficiently cool with liquid gas a part 15 located close to the forming hollow space 14 of the second mold half 12 and/or the molten plastic mass, or a molded part created from it by solidifying and situated in the forming hollow space 14. For this purpose, the part 15 to be cooled of the second mold half 12 is equipped with and, in this example of an embodiment ring-shaped expansion chamber 65, in which pressed in liquid gas vaporizes and expands. For the purpose of pressing in the liquid gas, the fixed object 5 has an inlet channel 61 for liquid gas. The rotating object 4 is surrounded by a ring-shaped groove 62, into which the inlet channel 61 merges. The ring-shaped groove is located on a contact surface 45 between the fixed object 5 and the rotating object 4; this contact surface 45 corresponds to the cylindrical external surface of the shaft 3. The transfer point between the inlet channel 61 and the ring-shaped groove 62 can be sealed with a seal implemented as a cutting (not illustrated). The rotating object 4 has a channel 63 consisting of, for example, two channel parts 63.1, 63.2 for liquid gas, which leads from the ring-shaped groove 62 into the expansion chamber 65. In the example of FIG. 2, the channel 63 splits-up into two or also several channel branches 64.1, 64.2. The latter channels 64.1, 64.2 in the rotating object 4 typically have very small diameters of 0.5 mm or less.

In order to enable an expansion of the gas at the desired place 15, the expansion chamber 65 has a much greater total cross-sectional surface area $2A_E$ than the sum $A_{K641}+AK_{642}$ of the cross-sectional surface areas of the channel branches 64.1, 64.2; the total cross-sectional surface area $2A_E$ of the expansion chamber 65 is in preference some hundred times, for example, 600 times greater than the sum $A_{K641}+AK_{642}$ of the cross-sectional surface areas of the channel branches 64.1, 64.2. In doing so, these cross-sectional surface areas $A_E, A_{K641}, A_{K642}$ are in essence measured in a plane vertical to the respective direction of flow of the gas. If the gas has two paths at its disposal, such as, e.g., in the ring-shaped expansion chamber 65, then for the calculation of the total cross-sectional surface area $2A_E$ the corresponding cross-sectional surface area AE has to be counted double.

In order to, on the contrary, prevent a vaporisation and/or an expansion of the gas on the way to the expansion chamber 65 and to compress the liquid gas even more for the purpose of achieving an optimum cooling effect, the inlet channel 61, ring-shaped groove 62, and channels 63.1, 63.2, 64.1, 64.2 are dimensioned as follows. The cross-sectional surface area $A_z$ of the inlet channel 61 (measured in a plane vertical or perpendicular to the direction of flow of the liquid gas) is greater than the twice $2A_N$ the cross-sectional surface area $A_N$ of the ring-shaped groove 62 (also measured in a plane vertical or perpendicular to the direction of flow of the liquid gas, i.e., in a plane that contains the rotation axis a). Twice $2A_N$ the cross-sectional surface area $A_N$ of the ring-shaped groove 62 is greater than the cross-sectional surface area $A_{K631}, A_{K632}$ of the channel 63, resp., the sum $A_{K641} + AK_{642}$ of the cross-sectional surface areas of the channel branches 64.1, 64.2 reduces towards the expansion chamber 65, for example, at one or more contractions 66.1, 66.2, in preference each time by 5 to 10%.

In summary, therefore for the cross-sectional surface areas $A_z, A_N, AK_{631}, A_{K632}, AK_{641}, A_{K642}, A_E$ therefore the inequality $2A_{E>Az} > 2A_N \geq A_{K631} \geq A_{K641} + A_{642}$ is applicable, whereby the factor ahead of $A_E$ for the example of a ring-shaped expansion chamber amounts to 2, for other geometries, however, can also assume another value, for example, 1.

After the expansion of the gas in the expansion chamber 65, the gas is taken away in a gaseous condition. For this purpose, e.g., the second mold half 12 in the region of the expansion chamber 65 can at least partially be made of porous steel, and the gas can be removed through the pores. Alternatively, the second mold half 12 can be equipped with evacuation bores 67, through which the gas is brought to the outside or into the forming hollow space 14. Such evacuation bores 67 can also be implemented as expansion bores with great cross-sectional surface area; their total cross-sectional surface area can preferably be some hundred times, for example 600 times, greater than the sum $A_{K641} + AK_{642}$ of the cross-sectional surface areas of the channel branches 64.1, 64.2. The evacuation bores 67 can, for example, be produced by galvanizing. On the surface of the second mold half 12, the gas removed can either simply escape to the ambient atmosphere. It can, however, also be collected, liquefied, brought back to a tank and used again for cooling; with a recycling like this, approx. 70–95% of the gas can be re-used after a cooling process, which is very efficient.

Figure 3:
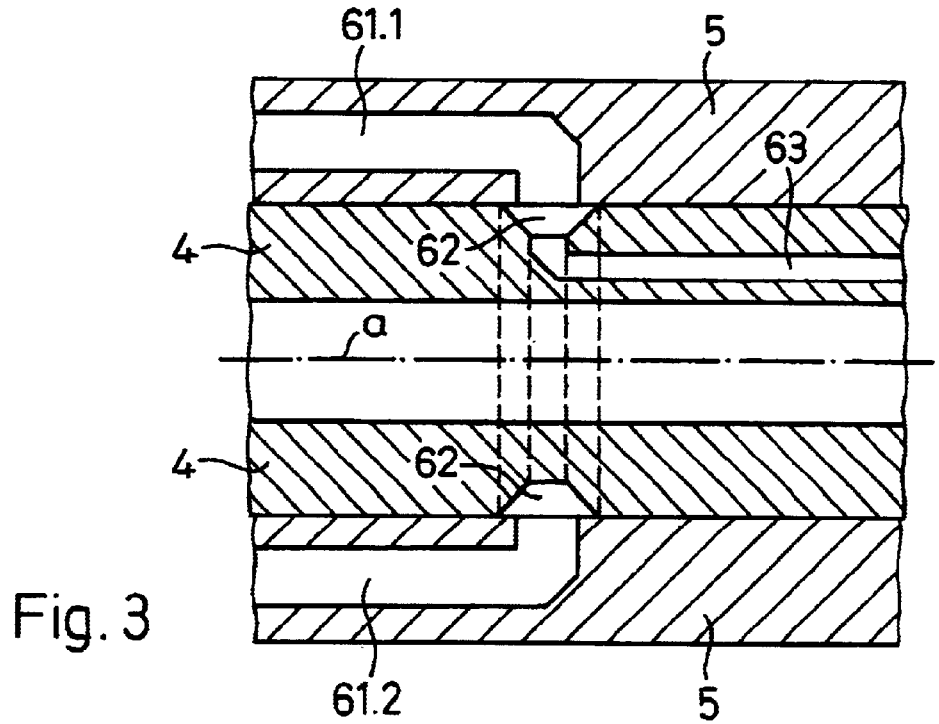
FIGS. 3–5 is a detail of different embodiments of the device in accordance with the invention in longitudinal section and FIG. 6 is a longitudinal section through a further exemplary embodiment of a device in accordance with the invention, used in an injection-molding machine.
Figure 4:
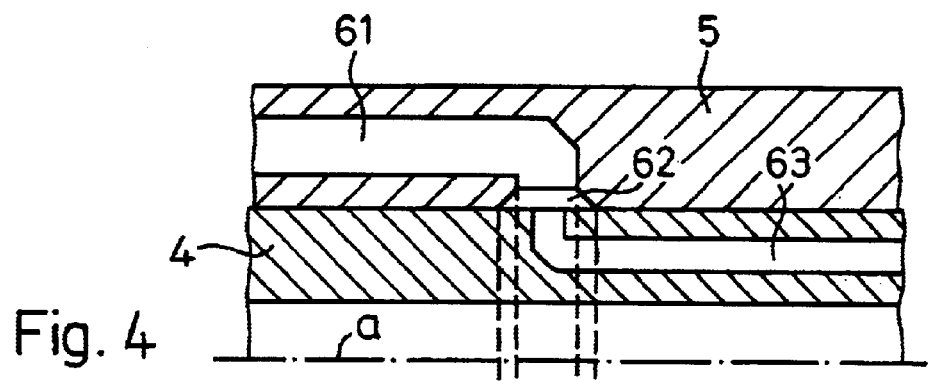
Figure 5:
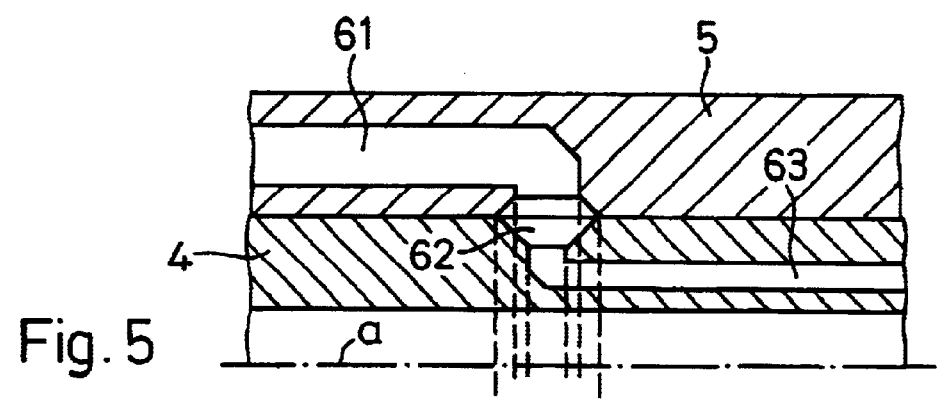

In the FIGS. 3–5, a detail of different embodiments of the device in accordance with the invention is depicted in longitudinal section, namely the ring-shaped groove 62, a part of the inlet channel 61 in the fixed object 5 and a part of the channel 63 in the rotating object 4. For the sake of simplicity, in FIGS. 3 and 4 only one half of the longitudinal section of the rotating object 4 is illustrated. In the example of an embodiment of FIG. 3, the ring-shape groove 62 is also, as in FIG. 2, machined into the rotating object 4. FIG. 3 shows a variant with several, for example, two inlet channels 61.1, 61.2. FIG. 4 depicts an example of an embodiment, in which the ring-shaped groove 62 is machined into the fixed object 5. FIG. 5 concerns a combination of the FIGS. 3 and 4 to the extent that the ring-shaped groove 62 is located both in the rotating object 4 as well as in the fixed object 5.

Figure 6:
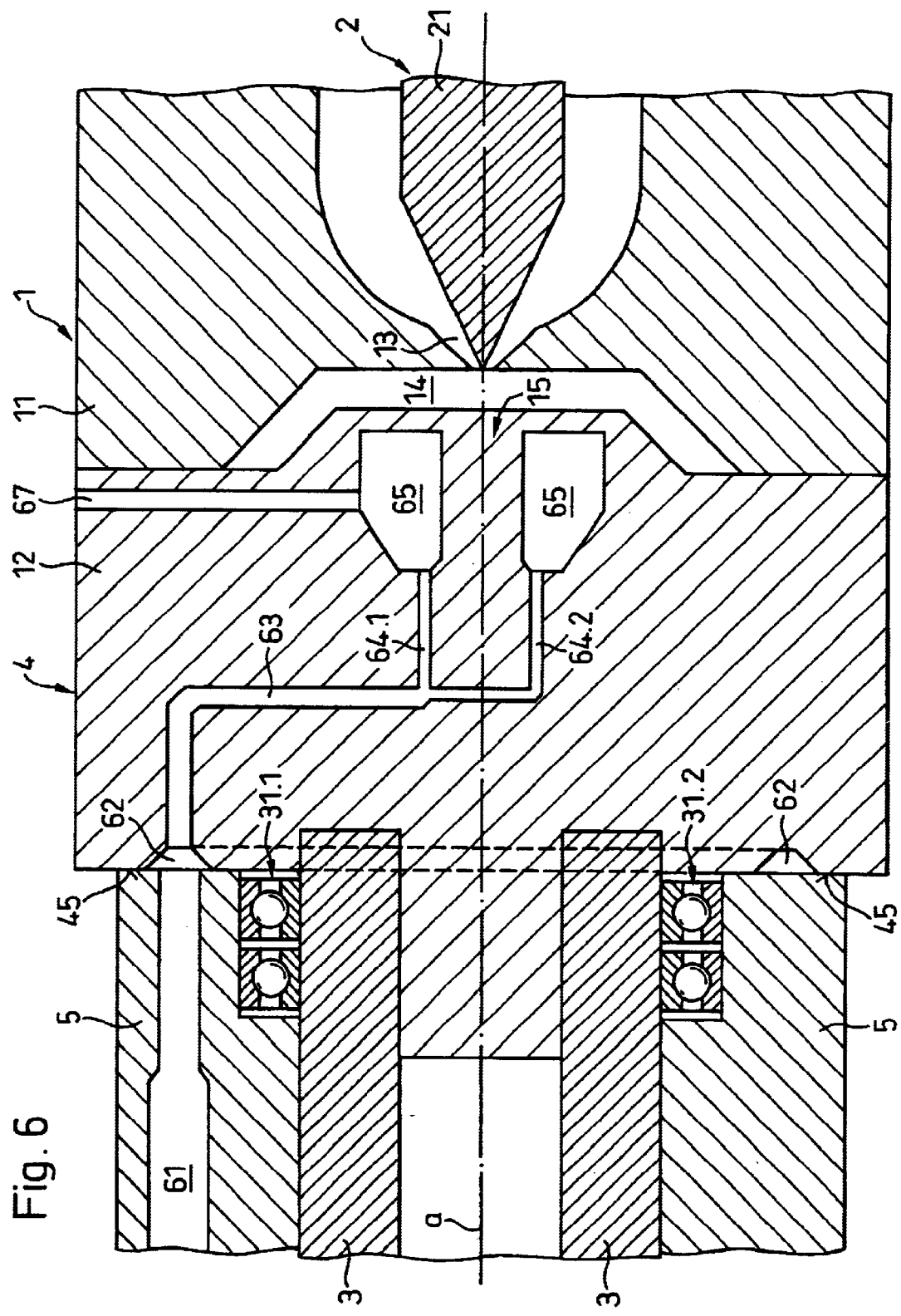

In the examples of embodiments of the FIGS. 2–5, the liquid gas was respectively pressed radially inwards, vertical or perpendicular to the axis of rotation a, into the ring-shaped groove 63. This, in accordance with the invention, does not necessarily have to be the case. FIG. 6 shows (an otherwise analogous to FIG. 2) an embodiment of the device in accordance with the invention, in which the liquid gas is pressed into a ring-shaped groove 62 parallel to the axis of rotation a. The ring-shaped groove 62 in this example is machined into the second half mold 12. The contact surface 45 in which the ring-shaped groove 62 is located in this example of an embodiment is vertical to the axis of rotation a. Other embodiments are conceivable, in which the liquid gas is even pressed into the ring-shaped groove 62 radially outwards or in another direction. It goes without saying, that combinations of the embodiments illustrated in the FIGS. 2–6 belong to the invention.

What is claimed is:

1. A method for internal cooling of a rotating object (4) with liquid gas, said rotating object rotating around a rotation axis (a), said gas being introduced into said rotating object (4) from a fixed object (5), wherein said liquid gas is pressed from at least one inlet channel (61) in said fixed object (5) into a ringshaped groove (62) located on a contact surface (45) between said fixed object (5) and said rotating object (4), pressed from said ring-shaped groove (62) into at least one channel (63, 64.1, 64.2) in said rotating object (4) and delivered to at least one part (15) of said rotating object, said gas, upon reaching said at least one part, evaporating while absorbing vaporization heat and thereby cooling said at least one part, and is removed in the form of gaseous gas.

2. The method in accordance with claim 1, wherein a greater cross-sectional surface area ($A_E$) is made available to said liquid gas in an area (65) surrounding said at least one part of said rotating object (15) than a sum ($A_{K641} + A_{K642}$) of the cross-sectional surface areas of said at least one channel (63, 64.1, 64.2), as a result of which said liquid gas expands and evaporates while absorbing vaporization heat.

3. The method in accordance with claim 1, wherein a total cross-sectional surface area available to said liquid gas on its path from said fixed object (5) to said at least one part of said rotating object (15) is left constant or reduced, so that said liquid gas does not expand.

4. The method in accordance with claim 1, wherein a total cross-sectional surface area available to said liquid gas on its path from said fixed object (5) to said at least one part of said rotating object (15) is reduced at least once, so that said liquid gas is compressed.

5. The method in accordance with claim 1, wherein said liquid gas is pressed into said ring-shaped groove (62) in the direction of said rotation axis (a).

6. The method in accordance with claim 1, wherein said gas is selected from the group consisting of carbon dioxide and nitrogen.

7. Application of the method in accordance with claim 1, for use in cooling molded parts in injection molding machines with rotating molds (1).

8. A device for internal cooling of a rotating object (4) with liquid gas, said rotating object rotating around a rotational axis (a), said gas being introduced to said rotating object from a fixed object (5), said fixed object (5) having at least one contact surface (45) with said rotating object (4), wherein said fixed object (5) has at least one inlet channel (61) for liquid gas, wherein, at said contact surface (45)

between said fixed object (5) and said rotating object (4), there is a ring-shaped groove (62) into which said at least one inlet channel (61) merges and the center of which is on the axis of rotation (a) of said rotating object (4), and wherein said rotating object (4) has at least one channel (63, 64.1, 64.2) for liquid gas, which leads from said ring-shaped groove (62) into an area (65) surrounding a part (15) of said rotating object.

9. The device in accordance with claim 8, wherein the area (65) surrounding said part (15) of said rotating object has a greater cross-sectional surface area ($A_E$) than a sum ($A_{K641}+A_{K642}$) of the cross-sectional surface areas of said at least one channel (63, 64.1, 64.2).

10. The device in accordance with claim 9, wherein the area (65) surrounding said part (15) of said rotating object comprises at least one expansion chamber.

11. The device in accordance with claim 8, wherein a sum of said cross-sectional surface areas ($A_Z$) of said at least one inlet channel (61) is greater than twice ($2A_N$) a cross-sectional surface area of said ring-shaped groove (62).

12. The device in accordance with claim 8, wherein two times ($2A_N$) said surface area of said ring-shaped groove (62) is greater than a sum ($A_{K631}$) of said cross-sectional surface areas of said at least one channel (63).

13. The device in accordance with claim 8, wherein a sum ($A_Z$) of said cross-sectional surface areas of said at least one inlet channel (61) to said ring-shaped groove (61) remains constant or reduces.

14. The device in accordance with claim 8, wherein a sum of said cross-sectional surface areas ($A_{K631}$) of said at least one channel (63) toward said part (15) of said rotating object remains constant or reduces.

15. The device in accordance with claim 8, wherein said ring-shaped groove (62) is machined into at least one of said rotating object (4) and said fixed object (5).

\* \* \* \* \*